United States Patent
Faynor

(10) Patent No.: US 7,430,055 B2
(45) Date of Patent: Sep. 30, 2008

(54) SYSTEM FOR CLONING DIGITAL PRINTER SETTINGS BY SENDING A CLONE FILE AS A PRINT JOB

(75) Inventor: John J. Faynor, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 882 days.

(21) Appl. No.: 10/876,877

(22) Filed: Jun. 25, 2004

(65) Prior Publication Data

US 2005/0286071 A1     Dec. 29, 2005

(51) Int. Cl.
*G06F 3/12* (2006.01)
*G06K 15/00* (2006.01)
(52) U.S. Cl. ................. 358/1.15; 358/1.13; 358/1.14
(58) Field of Classification Search .............. 358/1.15, 358/1.14, 1.13, 1.16, 1.17, 1.18, 1.1, 1.2, 358/1.3, 1.4, 1.6, 1.9, 1.11, 407, 437, 468; 347/2, 3, 5, 23; 399/1, 8
See application file for complete search history.

(56) References Cited

U.S. PATENT DOCUMENTS

| | | | | |
|---|---|---|---|---|
| 5,905,906 | A * | 5/1999 | Goffinet et al. | 710/8 |
| 6,124,938 | A | 9/2000 | Rabb et al. | 358/1.15 |
| 6,684,260 | B1 | 1/2004 | Foster et al. | 709/327 |
| 2002/0196451 | A1 | 12/2002 | Schlonski et al. | 358/1.1 |
| 2003/0233428 | A1 | 12/2003 | Spitzer et al. | 709/220 |

* cited by examiner

*Primary Examiner*—Dov Popovici
(74) *Attorney, Agent, or Firm*—R. Hutter

(57) ABSTRACT

In a network printing environment having a host computer and a plurality of printers, printer settings from the website of one printer are used to create a text file held in the host computer. The host computer adds a heading to the text file, and sends the text file as a print job to the IP address of a target printer. Software in the target printer recognizes the heading and then draws the data from the text file to populate the settings of the target printer.

8 Claims, 2 Drawing Sheets

SYSTEM FOR CLONING DIGITAL PRINTER SETTINGS BY SENDING A CLONE FILE AS A PRINT JOB

TECHNICAL FIELD

The present application relates to digital printing over a network.

BACKGROUND

With the increasing sophistication of office equipment, such as digital copiers, printers, facsimiles and scanners, as well as printers which combine many of these functions, individual machines (hereinafter described generically as "printers") become more and more software intensive. Much of the functionality associated with a particular printer dwells in the software of the printer, and particular functionalities of a printer can be set, and thus made to cooperate with a larger network, by providing selected values for what can be called the "settings" of the printer. Examples of "printer settings" currently used in practical applications include values relating to connectivity, e-mail, authentication, and others which will be discussed below.

A system administrator responsible for a large population of printers would like to establish the desired settings for various of the machines in an efficient manner. Typically, each printer on a network has associated therewith its own IP address and webpage, and the settings for the printer can be viewed and altered through the webpage. To manage a large number of printers in this way would require the administrator to access each webpage and manually check and change the settings on each page.

The present disclosure relates to a way of managing printer settings for a large number of printers.

PRIOR ART

U.S. Pat. No. 6,124,938 discloses sending software upgrade to a printer through a standard printer port.

U.S. Pat. No. 6,684,260 provides a software method to maintain efficient/consistent control of available driver settings in a network printing context.

US Published Patent Application 2002-0196451 discloses a system whereby configuration settings are noted from a template printer and then applied to a target printer.

US Published Patent Application 2003-0233428 describes the ability for a client printer (PC) to auto update its printer printer settings, so that it can still print to the printer, in the event of changes, like installation of a new print server.

SUMMARY

According to one aspect, there is provided a method of operating a digital printing system, comprising: providing a set of printer settings in a file; appending to the file a header; sending the file to a target printer as a print job; and the target printer populating a control system thereof with the settings.

DETAILED DESCRIPTION

Figure 1:
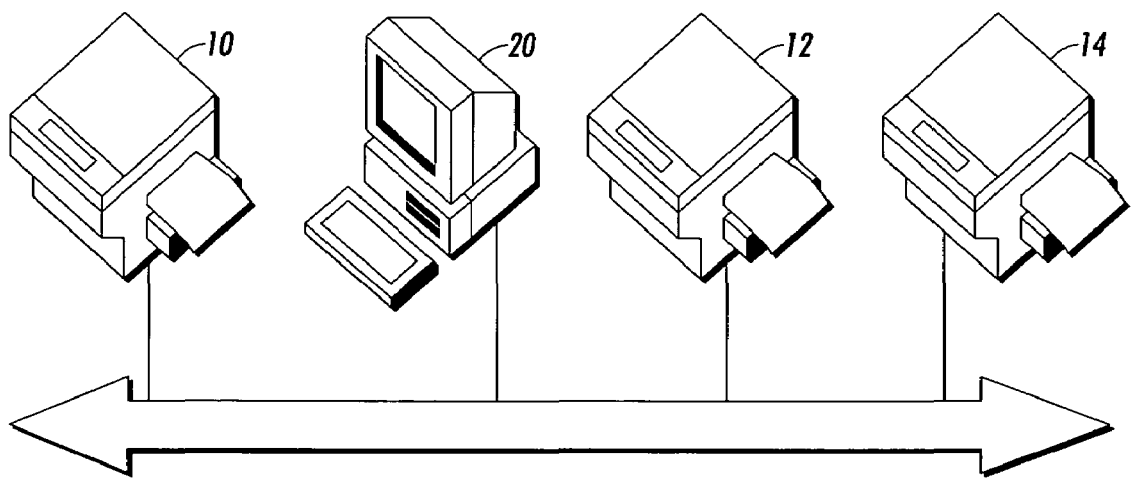
FIG. 1 is a diagram showing a set of digital printers, along with a host computer, on a network.

FIG. 1 is a diagram showing a set of digital printers, along with a host computer, connected on a network, as generally familiar in the prior art. Each printer can be a stand-alone printer, or a multifunction device with digital printer capabilities, including, in this embodiment, a website associated with the specific printer, through which data associated with the printer can be accessed. Of the printers shown, printer 10 can be considered a "source printer," while printers 12 and 14 can be called "target printers," as will be explained below. Also on the network is what is here called a "host computer" 20, which can a computer of any type operated, in a practical application, by a system administrator (SA). The host computer 20 communicates with the printers through familiar network protocols. The illustrated host computer 20 and printers can of course represent a small portion of a worldwide network of equipment.

In the following discussion, the source printer 10 is used to provide certain data known in the digital printing art as the "printer settings," which are required to be established for the operation of either or both of the target printers 12 and 14. First, source printer 10 is accessed via host computer 20 to determine certain printer settings thereof; this can be done through known means, typically by accessing the website resident on the controller of source printer 10. In a current practical implementation, among the values associated with "settings" are:

| Group | Component |
| --- | --- |
| Connectivity Settings | 1.1.1 Physical Connections |
|  | 1.1.2 AppleTalk |
|  | 1.1.3 NetWare |
|  | 1.1.4 TCP/IP |
|  | 1.1.5 SLP |
|  | 1.1.6 SSDP |
|  | 1.1.7 Microsoft Networking |
|  | 1.1.8 LPR/LPD |
|  | 1.1.9 RAW TCP/IP |
|  | 1.1.10 HTTP |
| Scan Settings | 1.2.1 Scanning Repository Setup |
| (Optional Feature: Scan to File) | 1.2.2 Default Repository Settings |
|  | 1.2.2 Alternate 1 Repository Settings |
|  | 1.2.2 Alternate 2 Repository Settings |
|  | 1.2.2 Alternate 3 Repository Settings |
|  | 1.2.2 Alternate 4 Repository Settings |
|  | 1.2.3 Template Pool |
| Printer Upgrade | 1.3 Auto Upgrade Settings |
| Email | 1.4 SMTP |
| (Optional Feature: Scan to Email) | 1.5 Email Settings |
|  | 1.6 LDAP Directory Settings |
| Authentication | 1.7 Authentication Type |
| (Optional Feature: Scan to File, | 1.7.1 SMB Authentication |
| Scan to Email, Ifax, or LAN | 1.7.2 NDS Authentication |
| (Server) Fax) | 1.7.3 Kerberos |
| Administration | 1.8.1 Email Alerts |
|  | 1.4 SMTP |
|  | 1.8.2 SNMP |
| IFAX | 1.9.1 POP3 Settings |
| (Optional Feature: IFax) | 1.4 SMTP Settings |
|  | 1.6 LDAP Directory Settings |
|  | 1.9.2 IFax Settings |
| Fax | 1.10.1 Fax Repository Settings |
| (Optional Feature: | 1.10.2 Fax Setup |
| LAN (Server) Fax) |  |
| Job Management and Printer Setup | 1.11.1 Job Management |
| Templates | N/A |
| (Optional Feature: Scan to File) |  |

Figure 2:
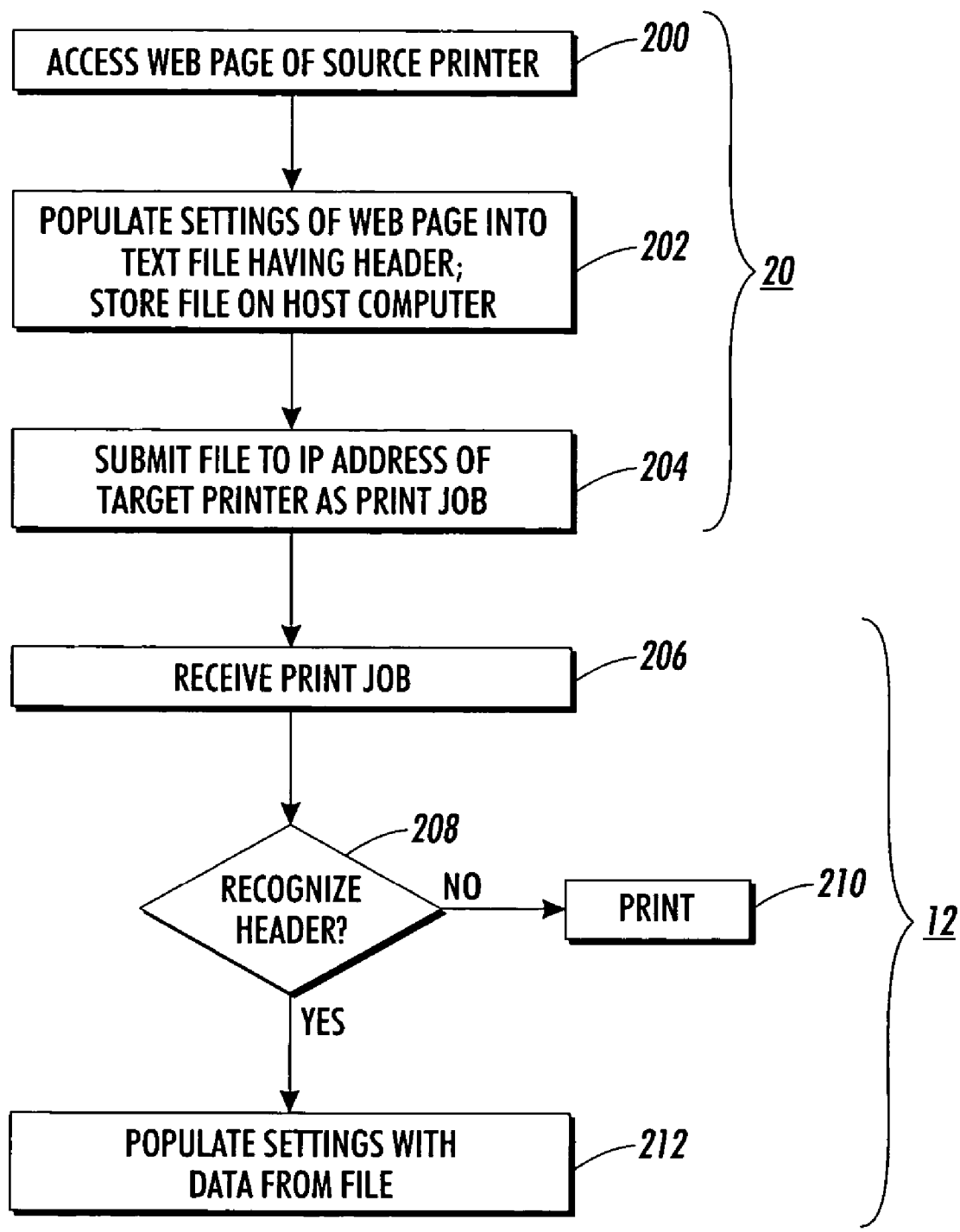
FIG. 2 is a flow-chart showing a method by which software resident on a host computer obtains settings from source printer and clones those settings to apply them to a target printer.

FIG. 2 is a flow-chart showing a method by which software (typically, but not necessarily) resident on a host computer 20 obtains settings from source printer 10 and clones those settings to apply them to a target printer such as 12. First, a web browser on host computer 20 accesses a web page resident on source printer 10 (step 200). Through tools known in the art, the settings are in effect read from the web page of source printer 10 and copied onto a text file within host computer 20 (step 202). The text file is typically simple ASCII file which can be manifest as, for example a text document which is retained on the host computer just like any document, such as within a folder or on the virtual desktop. The text file bearing the settings further includes a "header," a special code (which can have encryption aspects) which identifies other data in the text file as being associated with certain printer settings. The header is, in one possible embodiment, in DLM format; DLM headers can be processed using any kind of common print-submission tools, including tools which can send a single print file to multiple printers effectively simultaneously. To clone the settings of source printer 10 onto target printer 12, the text file is simply sent to the IP address of the target printer 12, exactly in the manner of any print job (step 204).

The following steps are carried out by the target printer 12, which has been pre-programmed with code that is sensitive to detect certain codes in the header of the incoming text file. When the text file is received at the IP address of the printer 12 (step 206), software at the printer is situated to detect whether the incoming print job is, in fact, a file for changing the settings, by checking a first predetermined number of characters in the text file to see if they are a suitable header (step 208). If no header code is found, the incoming file is treated as a conventional print job (step 210). If code for the header is found, however, subsequent code in the file is routed within printer 12 to populate the settings (step 212), using known tools. Techniques to make the printer port of target printer 12 sensitive to predetermined data strings in the header, as well as making a software pathway for the values in the file to set settings in the target printer, are generally known.

The header placed in the text file may include a digital signature, which can be detected and understood by software at the printer. The digital signature is useful to prevent unauthorized changing of the printer settings.

By causing the printer settings from the source printer 10 to form a text file which can be submitted as a print job, the process of setting printer settings for each of a large number of printers can be automated by the adaptation of known tools. For example, in order to provide settings to a plurality of printers, the text file having the desired settings can simply be sent as a print job to multiple printers at once. Standard print submission tools, such as LPR, can be used for this purpose. The sending of the print jobs can be scheduled to occur automatically at regular times. Most any scripting environment available on the host computer can be used to accomplish this.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of operating a digital printing system comprising:
   providing a set of printer settings in a text file;
   appending to the text file a header;
   sending the text file to a target printer as a print job;
   in response to the target printer detecting the header, the target printer populating a control system thereof with the settings.

2. The method of claim 1, further comprising obtaining the set of printer settings from a source printer.

3. The method of claim 1, further comprising providing to the target printer a detection program for detecting the header in an incoming print job.

4. The method of claim 1, further comprising providing to the target printer an extraction program for extracting the printer settings from the file.

5. The method of claim 1, further comprising including a digital signature in the header.

6. The method of claim 5, further comprising the target printer detecting the digital signature.

7. The method of claim 1, further comprising sending the text file to a plurality of target printers.

8. The method of claim 1, further comprising sending the text file to a target printer automatically at a predetermined time.

* * * * *